United States Patent [19]

Russell

[11] 4,166,240
[45] Aug. 28, 1979

[54] CONTROL CIRCUIT FOR CIRCUIT BREAKER AC MOTOR OPERATOR

[75] Inventor: Ronald R. Russell, Plainville, Conn.

[73] Assignee: General Electric Company, New York, N.Y.

[21] Appl. No.: 916,442

[22] Filed: Jun. 19, 1978

[51] Int. Cl.$^2$ ............................................. H02P 3/18
[52] U.S. Cl. .................................. 318/380; 318/245; 318/247; 318/381
[58] Field of Search ............... 318/245, 246, 247, 261, 318/273, 275, 375, 378, 379, 380, 381, 447, 466, 468; 322/59

[56] References Cited

U.S. PATENT DOCUMENTS

| 3,107,321 | 10/1963 | Osawa | 318/379 |
|---|---|---|---|
| 3,119,394 | 1/1964 | Knittel | 318/380 |
| 3,522,401 | 8/1970 | Stene | 200/153 |
| 3,548,276 | 12/1970 | Gross | 318/245 |
| 3,559,121 | 1/1971 | Powell et al. | 335/68 |
| 3,673,481 | 6/1972 | Hardin | 318/246 |
| 3,851,233 | 11/1974 | Sherman | 318/375 |

Primary Examiner—Gene Z. Rubinson
Assistant Examiner—M. K. Mutter
Attorney, Agent, or Firm—Robert A. Cahill; Walter C. Bernkopf; Philip L. Schlamp

[57] ABSTRACT

A control circuit controls AC energization of a universal, series wound AC motor in a circuit breaker motor operator to power a breaker charging cycle. At the end of a charging cycle, the motor field winding remains energized from the AC source, however a braking resistor is switched across the de-energized motor armature to achieve dynamic braking. A timing circuit operates in the dual capacity of controlling dynamic motor braking and preventing continued running of the motor operator should the breaker operating mechanism fail to reset during a charging cycle.

10 Claims, 1 Drawing Figure

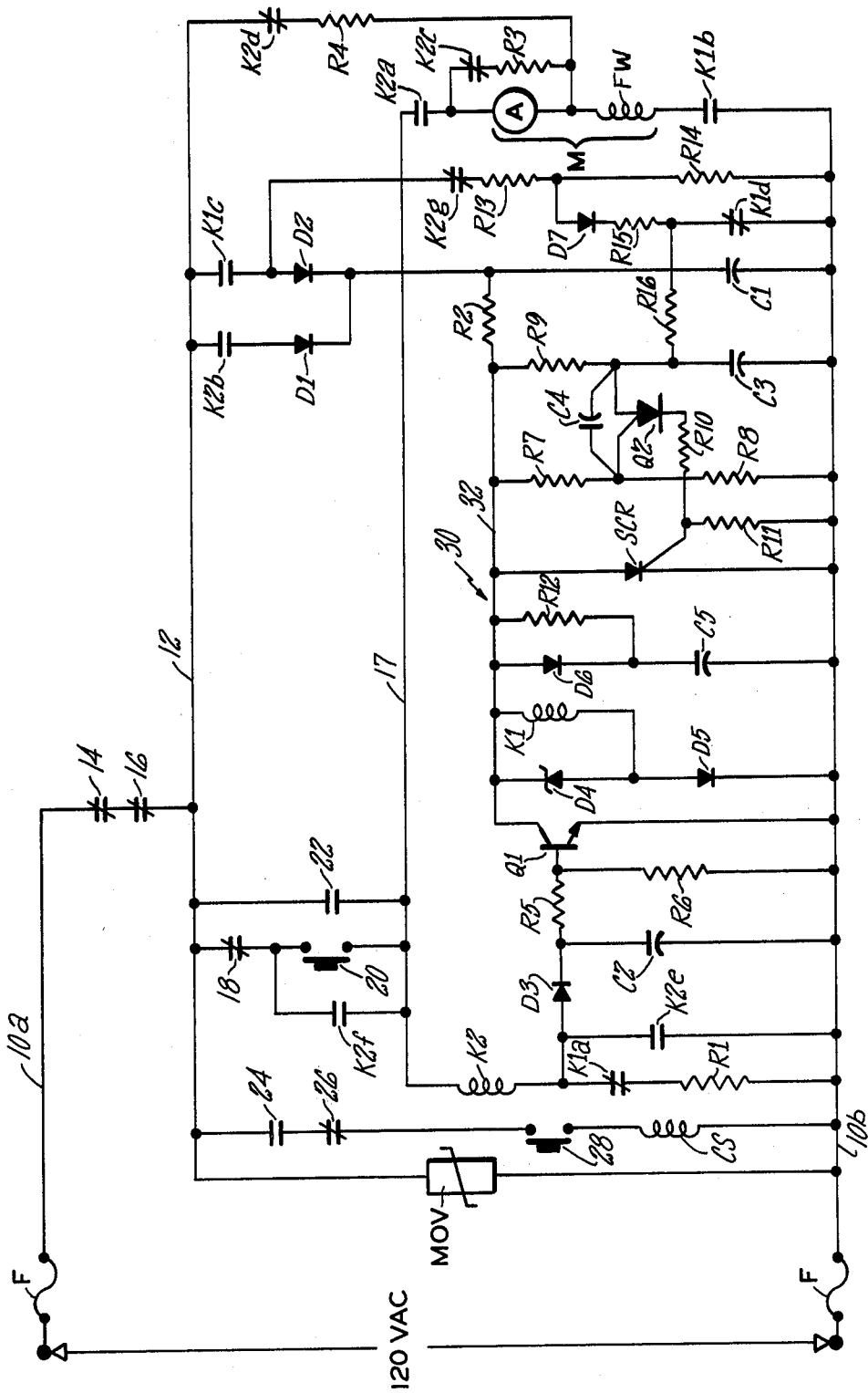

CONTROL CIRCUIT FOR CIRCUIT BREAKER AC MOTOR OPERATOR

BACKGROUND OF THE INVENTION

The present invention relates to circuit breaker motor operator control circuits, and particularly to a motor operator circuit for controllably energizing an AC motor from an AC source.

It has been common practice to utilize DC motors in circuit breaker motor operators because of their inherent capability of being readily and precisely controlled, particularly in terms of conveniently braking such motors to an abrupt halt using a purely electrical, dynamic braking approach. For example, as disclosed in my co-pending application, Ser. No. 889,755, filed Mar. 24, 1978, a circuit breaker motor operator utilizing a permanent magnet DC motor can be readily braked to a precise stop simply by interrupting DC current to the motor and switching in a braking resistor across the motor armature. The motor thus is effectively converted to a DC generator operating to pump current through the braking resistor, and its output shaft is dynamically braked to an abrupt halt, e.g., in considerably less than one second.

Unfortunately, a suitable source of DC current to power a circuit breaker motor operator is typically not readily available. Under these circumstances, AC current must be utilized, necessitating the additional expense of full-wave rectifying bridges. Energization of DC motors from a full-wave rectified AC voltage, with its inherent ripple, produces excessive arcing which drastically reduces the life of a DC motor. Adequate filtering to smooth out this ripple requires an electrolytic capacitor, which is relatively expensive and has packaging drawbacks due to its relatively large physical size. Electrolytic capacitors have the additional drawback by the propensity for losing their dielectric properties during prolonged periods of de-energization. Since circuit breaker motor operators are typically called upon to operate rather infrequently, this drawback is a significant one.

Accordingly, it is an object of the present invention to provide an improved motor operator control circuit.

A further object is to provide a motor operator control circuit of the above character which is equipped to controllably energize an AC motor from an AC current source.

An additional object is to provide a motor operator control circuit of the above character capable of instituting dynamic braking of an AC motor, pursuant to precisely braking the motor output shaft to an abrupt halt.

Yet another object is to provide a motor operator control circuit of the above character having particular application in circuit breaker motor operators.

A further object is to provide a circuit breaker motor operator control circuit having anti-pumping provisions.

Still another object of the present invention is to provide a circuit breaker motor operator control circuit of the above character which is inexpensive to manufacture, efficient in construction and reliable in operation.

Other objects of the present invention will in part be obvious and in part appear hereinafter.

SUMMARY OF THE INVENTION

In accordance with the present invention, there is provided a control circuit for controllably energizing an AC motor from an AC current source for a prescribed interval and then at a precise moment controllably dynamically braking the motor to an abrupt halt. The control circuit has application to motor operators generally, however application to motor operators of the type disclosed in U.S. Pat. No. 4,042,896 for charging industrial circuit breakers is specifically disclosed.

To this end, a breaker charging cycle is initiated by routing current from an AC source to a first relay which picks up to qualify energization of a second control relay included in a DC logic network receiving rectified power from the AC source. With both control relays picked up, the armature and field winding of a universal, series wound AC motor are connected in series across the AC source. The motor operator is then driven by the motor through a circuit breaker charging cycle. At the conclusion of a charging cycle, the first control relay is dropped out to disconnect the motor armature from the AC source and connect a braking resistor directly across the motor armature. In addition, energization of the motor field winding is continued, however, now via a path independent of the armature. The motor thus effectively becomes a generator pumping current through the braking resistor. Under these circumstances, the motor output shaft is dynamically braked to an abrupt halt.

To control this dynamic braking action, the DC logic network includes a timing circuit which is conditioned by the drop-out of the first control relay at the end of a charging cycle to prescribe a brief, but nevertheless adequate interval during which complete dynamic braking is achieved. Upon expiration of this brief interval, the timing circuit shuts down the DC logic network, whereupon the second control relay is dropped out to remove AC power from the motor field winding.

In accordance with an important feature of the invention, the timing circuit operates to also prescribe a second, considerably longer time interval somewhat in excess of time required to execute a successful breaker charging cycle. If, due to a problem with the breaker latch, the breaker operating mechanism is not reset during a charging cycle, the first control relay does not drop-out at the conclusion thereof. Consequently, the motor remains energized, and the breaker motor operator starts into another charging cycle, which invariably will be likewise unsuccessful in resetting the breaker operating mechanism. To prevent this needless charging or "pumping" of the breaker operating, the timing circuit, by virtue of the fact that the first control relay had not dropped out at the conclusion of a previous charging cycle, times out the longer time interval and then acts to drop-out the second control relay. Energization of the motor is thus interrupted and the charging cycle succeeding an unsuccessful one is aborted.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawing, in which the sole FIGURE of the drawing is a detailed circuit schematic diagram of a circuit breaker motor operator control circuit constructed in accordance with the invention.

DETAILED DESCRIPTION

Referring to the drawing, a suitable source of AC voltage, e.g., 120 VAC, is connected across buses 10a and 10b in which are incorporated fuses F for overcurrent protection. Bus 10a is connected via a pair of series, normally closed logic switches 14 and 16 to a bus 12. Bus 12, in turn, is connected to a bus 17 via the series combination of a normally closed logic switch 18 and a normally open charge command pushbottom switch 20 and also via a normally open logic switch 22. In addition, bus 12 is connected to bus 10b via a series circuit including a normally open logic switch 24, a normally closed logic switch 26, a normally open close command switch 28, and the operating coil of a circuit breaker closing solenoid CS. Transient overvoltage protection is provided by a metal oxide varistor MOV connected between buses 12 and 10b.

Normally closed logic switches 14, 16, 18 and 26, as well as normally open logic switches 22 and 24, are utilized to sense the conditions of the motor operator and the circuit breaker pursuant to coordinating the operation of a control circuit thereto. If the circuit breaker is equipped with a manual charging capability, logic switch 14 may be an interlock switch operating to disarm the motor operator control circuit during manual charging of the circuit breaker. In this context, logic switch 14 may correspond to handle interlock switch 86 disclosed in U.S. Pat. No. 4,042,896. Logic switch 16 may correspond to switch 182 disclosed in this patent as being utilized to sense whether the breaker contacts are open or closed. That is, logic switch 16 remains closed as long as the breaker contacts are open, thereby enabling the initiation of a breaker charging cycle by the motor operator. However, while the breaker contacts are closed, logic switch 16 is open to inhibit the initiation of a needless charging cycle. Logic switch 18 may be utilized in the same context as logic switch 180 disclosed in this patent for sensing when during the charging cycle the breaker operating mechanism has been reset. The condition of logic switch 24 is designed to complement that of logic switch 18. Thus, logic switch 24 remains open while the breaker operating mechanism is tripped and closes to arm the closing solenoid energization circuit when the operating mechanism is reset during a charging cycle. In this context, logic switches 18 and 24 correspond to the single pole, double throw logic switch 180 disclosed in U.S. Pat. No. 4,042,896. The conditions of logic switches 22 and 26 are likewise complementary and are utilized to sense whether or not the motor operator mechanism is in its home position. That is, switch 22 is open while the motor operator mechanism is in its home position and closes automatically in response to movement of the motor operator mechanism away from its home position pursuant to executing a breaker operating mechanism charging cycle. On the other hand, logic switch 26 is closed while the operator mechanism is in its home position and opens while a charging cycle is in progress. Thus, logic switch 22 corresponds to logic switch 136 of this patent, while logic switch 26 corresponds to logic switch 134.

Bus 17 is connected to bus 10b through the series combination of the operating coil of a control relay K2, normally closed contacts K1a of another control relay K1 whose operating coil is included in a DC logic network, generally indicated at 30, and a resistor R1. Also connected between buses 17 and 10b is a series combination of normally open contacts K2a of control relay K2, normally open contacts K1b of control relay K1 and an AC motor M. In accordance with the illustrated embodiment of the present invention, this motor is a universal series wound AC motor consisting of a series connected armature A and field winding FW. Half-wave rectified power for DC logic network 30 is derived from bus 12 via normally open contacts K2b, diode D1 and resistor R2 to a positive voltage bus 32. Alternatively, bus 32 is energized from bus 12 via normally open contacts K1c of control relay K1, diode D2 and resistor R2. A filtering capacitor C1, connected from the junction of resistor R2 and the common cathodes of half-wave rectifying diodes D1 and D2 to bus 10b, serves to filter the half-wave rectified voltage applied to bus 32. The armature A of motor M is shunted by normally closed contacts K2c of control relay K2 and a dynamic braking resistor R3. Bus 12 is connected to the junction between armature A and field winding FW of motor M via normally closed contacts K2d of control delay K2 and a current limiting resistor R4.

With the breaker operating mechanism tripped and the breaker contacts thus open, together with the motor operator mechanism being in its home position poised to execute a charging cycle, the conditions of the various logic switches and relay contacts are as illustrated in the drawing. To initiate a charging cycle, charge command pushbutton switch 20 is momentarily closed to apply AC power to bus 17. Current is drawn through the operating coil of control relay K2, normally closed contacts K1a of control relay K1 and resistor R1. By virtue of the switching logic utilized, it is imperative that control relay K2 pick up and stay in before control relay K1 picks up. It will be noted that should control relay K2 for any reason pick up momentarily to close its contacts K2b and power up the DC logic network 30, control relay K1 can be sufficiently energized to pick up. If control relay K2 should then drop-out, leaving control relay K1 picked up, the control circuit goes into a dynamic braking mode at the very beginning of a charging cycle, which obviously is inappropriate. To preclude this situation from ever occurring, the junction between the operating coil for control relay K2 and relay contacts K1a for control relay K1 is connected via a diode D3 and a resistor R5 to the base of a transistor clamp Q1. The anode of diode D3 is connected to bus 10b via normally open contacts K2e of control relay K2, while the cathode of this diode is connected to bus 10b via a filtering capacitor C2. The collector of transistor Q1 is connected to bus 32 of DC logic network 30 and its emitter is connected directly to bus 10b, while its base is connected to bus 10b via a resistor R6. It is seen that until control relay K2 picks up to close its contacts K2e, sufficient voltage is developed across resistor R1 to drive transistor Q1 into conduction and thus effectively clamp bus 32 of DC logic network 30 to bus 10b. Under these circumstances, control relay K1 cannot pick up. When control relay K2 does pick up, its contacts K2b close to power up the DC logic network 30, and its contacts K2e close to remove the biasing voltage from the base of transistor Q1. This transistor cuts off to remove its clamp, thereby enabling the operating coil for control relay K1 to be energized. If control relay K2 should drop-out after control relay K1 has picked up to close its contacts K1c and maintain power on bus 32 of DC logic network 30, it is seen that contacts K2e reopen to make available base drive for transistor Q1, which then goes into conduction to clamp bus 32 to bus 10b. It is thus seen that during a charging cycle, control relay K2 must stay in for control relay K1 to stay in.

When control relay K2 picks up in response to the initiation of a charge command via closure of pushbutton switch 20, its contacts K2c open to remove the braking resistor from across motor armature A and its contacts K2d open to disconnect bus 12 from the junction of the motor armature and field winding FW. Contacts K2a close, as do contacts K1b when control relay K1 picks up, to complete an AC energization circuit between buses 17 and 10b for the series connected motor armature A and field winding FW. Further, contacts K2f of control relay K2 also close to shunt the contacts of pushbutton switch 20, and thus only momentary depression of the pushbutton charge command switch is required to initiate a charging cycle. As the motor operator mechanism leaves its home position to start into a charging cycle, logic switch contacts 22 close to shunt logic switch 18 and pushbutton charge command switch 20, and thus seal in the energization circuit for motor M for the duration of a charging cycle. With the closure of logic switch 22, logic switch 26 opens to disarm the closing solenoid CS energization circuit for the duration of the charging cycle.

Considering the DC logic network 30, a Zener diode D4 and a conventional diode D5 are connected in series between bus 32 and bus 10b. The operating coil of control relay K1 is connected in shunt with Zener diode D4, with the latter functioning to limit the maximum voltage that can be developed across this operating coil. A voltage divider, consisting of resistors R7 and R8 is connected across buses 32 and 10b, with the junction of these two resistors connected to the gate of unijunction transistor Q2. The anode of this unijunction transistor is connected to bus 32 via a resistor R9 and to bus 10b via a timing capacitor C3. The cathode of unijunction transistor Q2 is connected via a resistor R10 to the gate of a thyristor, such as a silicon controlled rectifier SCR, whose anode is connected to bus 32 and cathode is connected to bus 10b. A resistor R11 is connected between the gate of thyristor SCR and bus 10b. A small capacitor C4 is connected between the anode and gate of unijunction transistor Q2 for noise rejection purposes. To limit the rate of voltage rise on the anode of thyristor SCR, and thus preclude spurious triggering thereof, a resistor R12 and a capacitor C5 are connected in series between buses 32 and 10b. Resistor R12 is shunted by a diode D6 poled to accommodate rapid charging of capacitor C5 and thus suppress rapid rises of the voltage appearing on bus 32. The charge on capacitor C5 additionally serves in conjunction with filtering capacitor C1 to smooth out the ripple in the half-wave rectified DC voltage on bus 32.

Connected from the junction of diode D2 and contacts K1c of control relay K1 to bus 10b is the series combination of normally closed contacts K2g of control relay K2, and resistors R13 and R14. The junction between these two resistors is connected to bus 10b via a diode D7, a resistor R15 and the normally closed contacts K1d of control relay K1. The junction between resistor R15 and relay contacts K1d is connected to the anode of unijunction transistor Q2 by resistor R16. Prior to the initiation of a charging cycle, the normally closed relay contacts K1d maintain timing capacitor C3 in a discharged state. Upon initiation of a charging cycle, these relay contacts open to permit timing capacitor C3 to charge. Also during a charging cycle, relay contacts K2g are open to disconnect timing capacitor C3 from bus 12 through the then closed relay contacts K1c.

At the appropriate moment during a charging cycle, the breaker operating mechanism is reset, whereupon logic switch 18 opens and logic switch 24 closes. The charging cycle continues uninterrupted by virtue of the closed condition of logic switch 22, while the closing solenoid energizing circuit remains disarmed due to the open condition of logic switch 26. Upon the return of the motor operator mechanism to its home position concluding a charging cycle, logic switch 22 opens to interrupt the series energization circuit for motor M, as well as the energization circuit for the operating coil of control relay K2. This control relay drops out, and its contacts revert to the conditions illustrated in the drawing. It will be noted that control relay K1 does not drop-out since power to the control logic network 30 is maintained through the still closed contacts K1c of this relay. With the closure of contacts K2c, braking resistor R3 is connected across the armature A of motor M, while AC energization of field winding FW is now established from bus 12 through now closed relay contacts K2d, current limiting resistor R4 and still closed relay contacts K1b to bus 10b. With AC energization of field winding FW maintained, its field flux coacts with armature A to effectively convert motor M to a synchronous generator operating mode pumping current through braking resistor R3. There is thus achieved dynamic braking action effective in abruptly bringing the motor output shaft to a precise stop, and the motor operator mechanism is halted rather precisely at its home position.

To drop-out control relay K1 and thus terminate this dynamic braking action, the closure of contacts K2g as control relay K2 drops out at the conclusion of a charging cycle completes an additional charging path for timing capacitor C3 from bus 12 through relay contacts K1c, resistor R13, diode D7, resistor R15, and resistor R16. This timing capacitor is thus charged at a dramatically faster rate to the programmed threshold level necessary to fire unijunction transistor Q2. With the conduction of this transistor, gate voltage is developed across resistor R11 to fire thyristor SCR, thereby clamping bus 32 to bus 10b. With the inclusion of diode D5 to match the diode voltage drop of thyristor SCR, the voltage across the operating coil of control relay K1 abruptly drops to zero, thereby insuring that this relay drops out.

As an additional feature of the present invention, the control logic network 30 also functions in an "anti-pumping" capacity to prevent the execution of repetitive charging cycles in the event the breaker operating mechanism fails to reset during a previous charging cycle. This situation can arise due to a defect in the breaker latch or, more commonly, due to disablement of the breaker latch by an undervoltage release device. It will be recalled that logic switch 18 opens when the breaker operating mechanism is reset. However, if the breaker operating mechanism is not reset during a charging cycle, this switch remains closed. Consequently, the opening of logic switch 22 at the conclusion of an unsuccessful charging cycle is not effective in dropping out control relay K2. Consequently, dynamic braking of motor M is not instituted. In fact, since control relay K1 also does not drop-out at the conclusion of an unsuccessful charging cycle, normal AC energization of the motor continues, and the motor operator mechanism is driven into a second charging cycle. It will be noted however that the charge accummulated on timing capacitor C3 during the unsuccessful charging cycle is not dissipated at the conclusion thereof, and thus additional charge is accumulated during the succeeding charging cycle. At some point in time during this charging cycle or possibly the next charging cycle, the voltage developing across timing capacitor C3 rises to the programmed level established at the gate of unijunction transistor Q2, whereupon this transistor fires to in turn trigger thyristor SCR, and logic network bus 32 is clamped to bus 10b. Consequently, control relay K1 is dropped out to interrupt, through the opening of its contacts K1b, the energization circuit for motor M. Consequently, the charging cycle in progress is aborted. Logic switch 14 may then be manually opened to dropout control relay K2.

It will be noted that following a successful charging cycle, both logic switches 24 and 26 are closed to fully arm the energization circuit for closing solenoid CS. Upon depression of the close command pushbutton switch 28, the closing solenoid is energized to articulate a hook, such as illustrated in the above-noted U.S. Pat. No. 4,042,896, whereupon the breaker contacts are released for closure as the operating mechanism springs, which were charged during the charging cycle, discharge. Upon closure of the breaker contacts, logic switch 16 opens to disable the circuit breaker motor operator control circuit.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A motor operator control circuit comprising, in combination:
   A. first and second buses for connection across a source of AC voltage;
   B. a first control relay having
      (1) an operating coil connected in circuit between said first and second buses,
      (2) first and second sets of normally closed contacts, and
      (3) a third set of normally open contacts;
   C. an AC motor having a series connected armature and field winding, said armature connected to said first bus via said third set of relay contacts and said field winding connected to said second bus, the junction between said armature and field winding connected to said first bus via said first set of relay contacts;
   D. a braking resistor connected in series with said second set of relay contacts across said motor armature; and
   E. switching means for completing an energization circuit for said first relay between said first and second buses for the duration of a motor operator operating cycle, thereby activating said first relay to close its third set of contacts and enable energization of said motor, at the conclusion of an operating cycle said switching means operates to deactivate first relay, causing its third set of contacts to open and disconnect said armature from said first bus and its first and second sets of contacts to close, connecting said braking resistor across said armature and said field winding to said first bus independently of said armature, thereby dynamically braking said motor.

2. The motor operator control circuit defined in claim 1, wherein said first control relay includes a fourth set of normally open contacts, said control circuit further includes a second control relay having
   (1) an operating coil connected in circuit with said fourth set of contacts of said first relay between said first and second buses,
   (2) a first set of normally open contacts for completing an energization circuit between said first and second buses for said operating coil of said second relay independently of said fourth contacts of said first relay, and
   (3) a second set of normally open contacts for completing the circuit connection between said motor field winding and said second bus during motor energization and dynamic motor braking.

3. The motor operator control circuit defined in claim 2, which further includes a timing circuit conditioned by deactivation of said first relay at the conclusion of an operating cycle to deactivate said second relay after a predetermined short time delay adequate to fully dynamically brake said motor.

4. The motor operator control circuit defined in claim 3, which further includes deactivating means controlled by a fifth set of contacts of said first relay for deactivating said second control relay should said first control relay become deactivated prior to completion of an operating cycle.

5. The motor operator control circuit defined in claim 2, which further includes a current limiting resistor connected in series with said first set of relay contacts between said first bus and the junction of said motor armature with said motor field winding.

6. The motor operator control circuit defined in claim 2, which further includes a DC logic network connected between said first and second buses via said fourth contacts of said first relay and a first diode and via said first set of contacts of said second relay and a second diode, said operating coil of said second relay being included in said network, and said network further including a timing circuit having timing capacitor and a voltage threshold detector, said timing capacitor connected to be charged from said first bus via a fifth set of normally closed contacts of said first relay, said threshold detector operating in response to the charging of said capacitor to a predetermined threshold voltage to effect deactivation of said second relay upon expiration of a predetermined time delay following deactivation of said first relay upon completion of an operating cycle.

7. The motor operator control circuit defined in claim 6, which further includes clamping means controlled by a sixth set of contacts of said first relay for removing operating voltage from said DC logic network and thereby force premature deactivation of said second control relay should said first control relay become deactivated prior to completion of an operating cycle.

8. The motor operator control circuit defined in claim 7, wherein said second control relay includes a third set of normally closed contacts connected to discharge said timing capacitor upon deactivation of said second relay.

9. The motor operator control circuit defined in claim 8, wherein said motor is coupled to charge a circuit breaker operating mechanism during an operating cycle, said switching means including logic switches for sensing the resetting of the breaker operating mechanism during an operating cycle and for sensing the completion of an operating cycle, said logic switches functioning to deactivate said first relay upon completion of an operating cycle only when the breaker operating mechanism has been successfully reset, and said timing circuit operating in response to the failure of said fifth set of contacts of said first relay to close upon completion of an operating cycle to time out a predetermined longer time delay interval and to effect deactivation of said second relay upon the expiration thereof.

10. The motor operator control circuit defined in claim 9, which further includes a circuit breaker closing solenoid connected in an energization circuit between said first and second buses and said switch means including additional logic switches operating to arm said closing solenoid energization circuit upon completion of an operating cycle which was successful in resetting the breaker operating mechanism.

* * * * *